Patented Aug. 16, 1927.

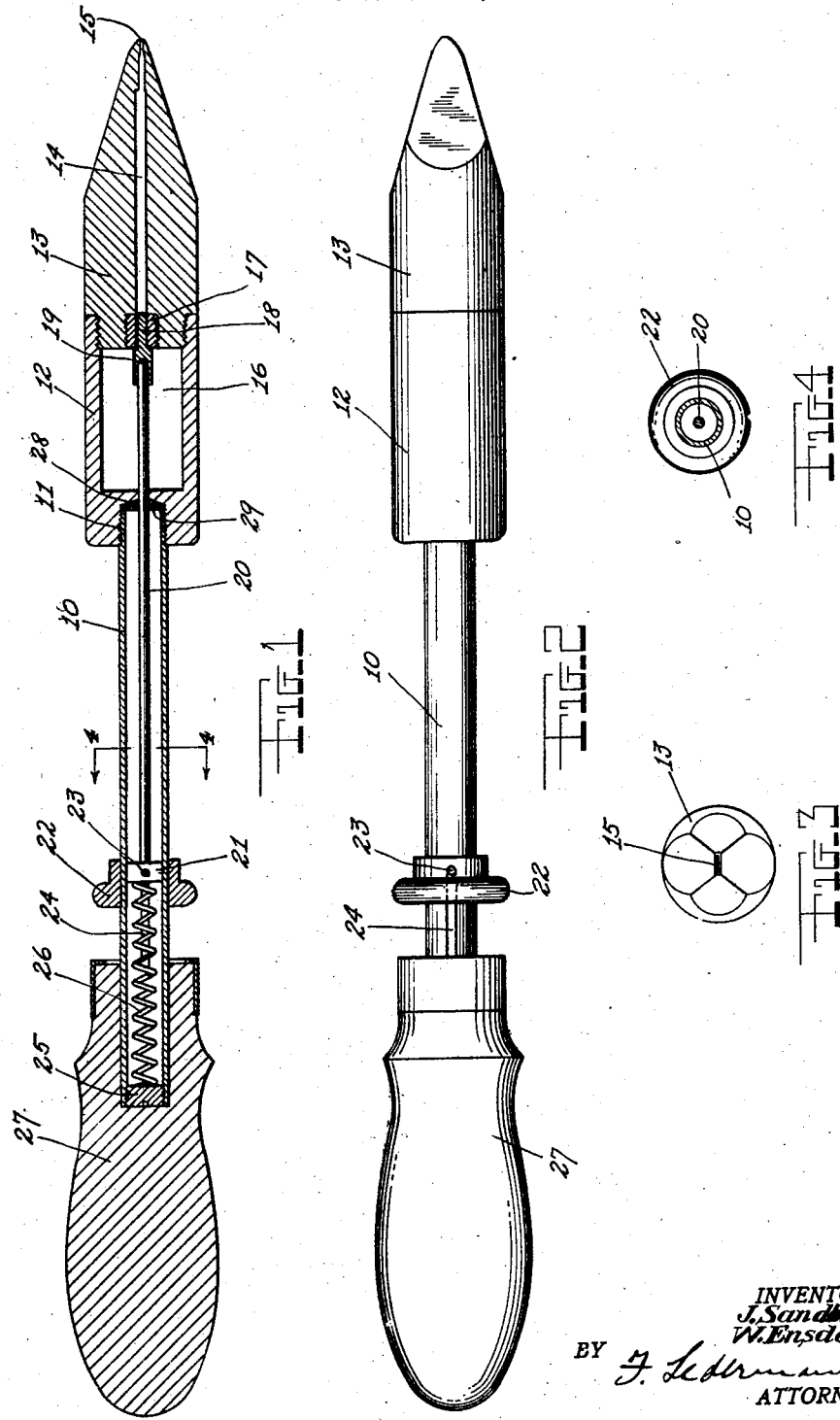

1,639,537

UNITED STATES PATENT OFFICE.

JOHANNES SANDBERG, OF ELIZABETH, NEW JERSEY, AND WALTER ENSDORF, OF NEW YORK, N. Y.

SOLDERING IRON.

Application filed January 31, 1927. Serial No. 164,681.

The main object of this invention is to provide a soldering iron which is equipped with a magazine whose chamber communicates with the channel in the soldering head, the entrance to the channel of the latter being closed by a valve which is actuated by a plunger situated near the handle of the soldering head. The entire article is made so that it will function with the utmost efficiency and is constructed in a manner which will permit the removal and disassemblage of all parts so that any of said parts may be quickly and conveniently replaced. The soldering iron is particularly provided with a detachable soldering head, a detachable valve seat, packing at the position where the plunger actuating the valve passes into the stem of the iron, and a spring for retaining the valve normally on the seat which is situated at a position remote from the heating element of the device.

The above and other objects will become apparent in the description below in which characters of reference refer to like-named parts in the drawing.

Referring briefly to the drawing, Figure 1 is a longitudinal sectional elevational view thru the soldering iron.

Figure 2 is an external longitudinal elevational view of the soldering iron.

Figure 3 is an end elevational view of the soldering head.

Figure 4 is a sectional view taken on line 4—4 of Figure 1.

Referring in detail to the drawing, the numeral 10 indicates a substantially long tube which forms the stem of the soldering iron and is provided with threads at one end which are indicated by the numeral 11. The threaded end of the tube engages and is secured to a hollow shell 12 which forms the reservoir of the device. This reservoir has a chamber 16 therein which is open at one end and is threaded at that end. The threaded end of the reservoir engages the soldering head 13 of the device. The latter has a tapering pointed end and thruout its entire length a channel 14 extends which at its extreme end is formed into a rectangular mouth 15. The soldering head 13 is preferably composed of copper or some similar material and at the inner end of the channel 14 of the head a hollow stud 17 is mounted and serves as a seat for the guide 18 of a valve 19. The guide 18 of the valve is of smaller dimension than the bore of the seat and the entire valve is removably mounted on the end of the rod 20 which serves as the plunger for the closing of the valve by urging the valve into contact with the seat 17. This rod extends entirely thru the reservoir and then passes into the stem of the soldering iron to a position near its opposite end at which it is provided with a head 21 which slidably retains the plunger in axial position in the stem of the device.

A ring 22 is slidably mounted externally on the stem of the device and has a pin 23 passing diametrically thru it. Said pin passes thru slots 24 which are formed longitudinally in the walls of the stem and also pass thru the head of the plunger securing the plunger to the ring. The opposite end of the stem is closed by a threaded plug 25 which retains a coiled spring 26 in place in the stem between it and the head of the plunger said spring having for its purpose to extend the valve into contact with the seat 17 mounted in the closed end of the reservoir. The end of the stem opposite to the reservoir has a handle 27 mounted thereon which serves as a means for holding the entire device in the hand.

The threads 11 on the stem engage in a hole provided in the closed end of the reservoir and the floor of this hole is conical in shape and forms a seat for a pulp packing 28 which is covered by a washer 29, the washer having the end of stem 10 seated thereon.

The soldering iron is used for purposes which are obvious and a description of its use will not be attempted beyond stating the rectangular mouth 15 permits the device to be particularly useful where straight line soldering is to be made. Colder solder material is placed or thrown into the chamber 16 after the soldering head 13 has been removed from the reservoir 12 after which the soldering head is again replaced after which the device is ready for use. The channel 14 is normally closed by the valve which rests on the seat 17, to the entrance of solder which latter will only flow when the valve 19 is lifted from its seat. To open the valve or lift the same from its seat the ring 22 is slidably moved toward the handle 27. This manipulation retracts the guide partly out of the bore of the seat and thereby opens communication between the channel 14 and the chamber 16 of the reservoir permitting the solder to flow to the mouth 15. The packing 28 when compressed by the washer 29 forms a leak-proof fit at the position where the plunger passes thru the hole in the roof of the reservoir.

It is to be noted that certain changes in form and construction may be made without departing from the spirit and scope of the invention.

We claim;

1. In a soldering iron, a soldering head having a channel passing therethrough, a reservoir attached to said head, a stem on said reservoir, a plunger slidable in said stem and reservoir, a detachable valve on said plunger, a detachable valve seat mounted in said head at the reservoir end of said channel cooperating with said valve to open or close said channel, and means on said stem for reciprocating said plunger.

2. In a soldering iron, a soldering head having a channel therein, a reservoir threadably engaging said head, a hollow stem engaging said reservoir, a plunger reciprocal in said stem passing into said reservoir, and a detachable valve on said plunger normally closing communication between said channel and reservoir.

3. In a soldering iron, a soldering head having a channel passing therethru, a reservoir engaging said head, a stem attached to said reservoir, a plunger slidable in said stem passing into said reservoir, a detachable valve seat threadably mounted in said head at the reservoir end of said channel, a detachable valve on said plunger cooperating with said seat to open or close said channel, a ring slidable on said stem attached to said plunger, and a spring normally extending said plunger into the reservoir to close said channel.

4. In a soldering iron, a soldering head having a channel therein, a reservoir engaging said head, a hollow stem attached to said reservoir, a plunger slidable in said stem and reservoir, a detachable valve on the end of said stem within said reservoir, a valve seat removably mounted in said soldering head having said valve seating thereon when the valve is in closed position, said valve being normally in seating position, resilient means in said stem for normally seating said valve, and means slidable on said stem for retracting said plunger and valve to open communication between the channel and the reservoir.

In testimony whereof we affix our signatures.

JOHANNES SANDBERG.
WALTER ENSDORF.